Aug. 10, 1965  L. C. CHOUINGS  3,199,632
CLOSED LOOP, SPOT TYPE, DISC BRAKE
Filed Oct. 17, 1961  7 Sheets-Sheet 1

INVENTOR
LESLIE CYRIL CHOUINGS

By Lawrence J. Winter
ATTORNEY

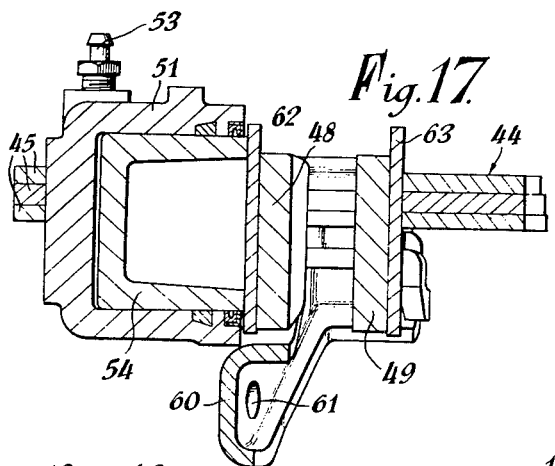

INVENTOR
LESLIE CYRIL CHOUINGS

Aug. 10, 1965  L. C. CHOUINGS  3,199,632
CLOSED LOOP, SPOT TYPE, DISC BRAKE
Filed Oct. 17, 1961  7 Sheets-Sheet 4

INVENTOR
LESLIE CYRIL CHOUINGS

By Lawrence J. Winter
ATTORNEY

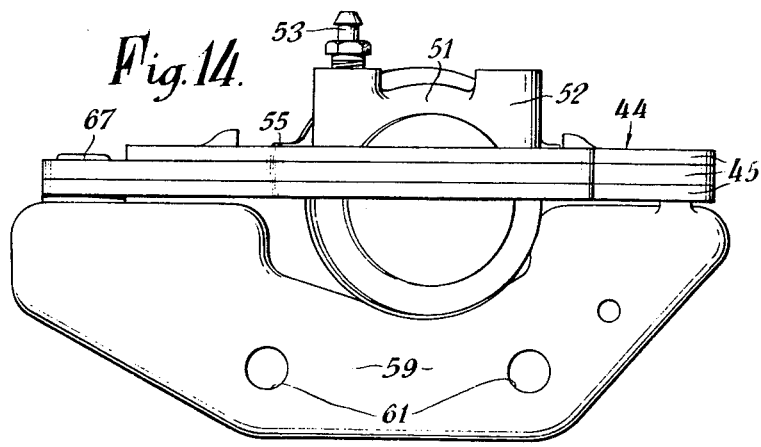
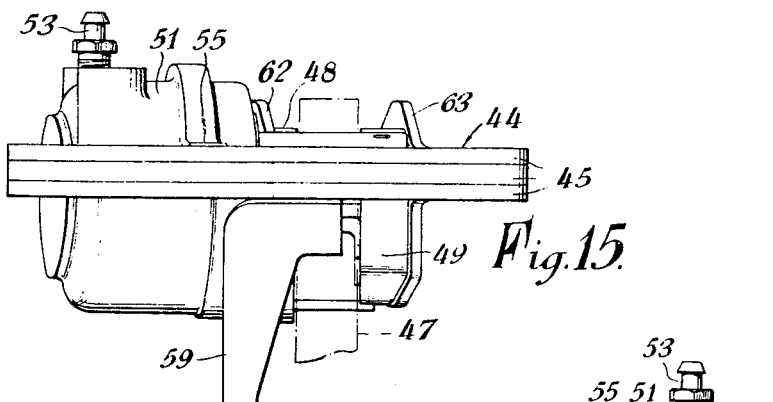
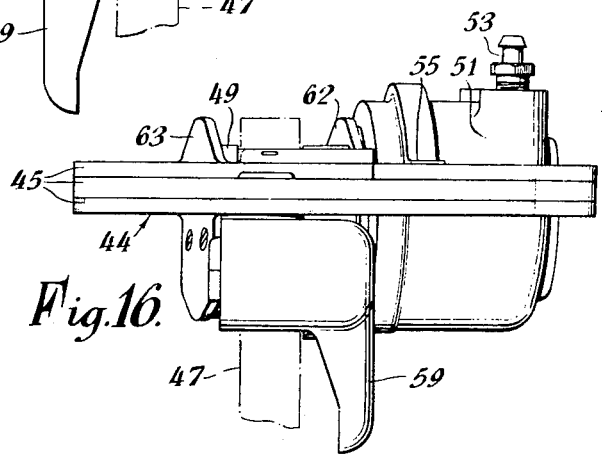

Aug. 10, 1965    L. C. CHOUINGS    3,199,632
CLOSED LOOP, SPOT TYPE, DISC BRAKE
Filed Oct. 17, 1961    7 Sheets-Sheet 6
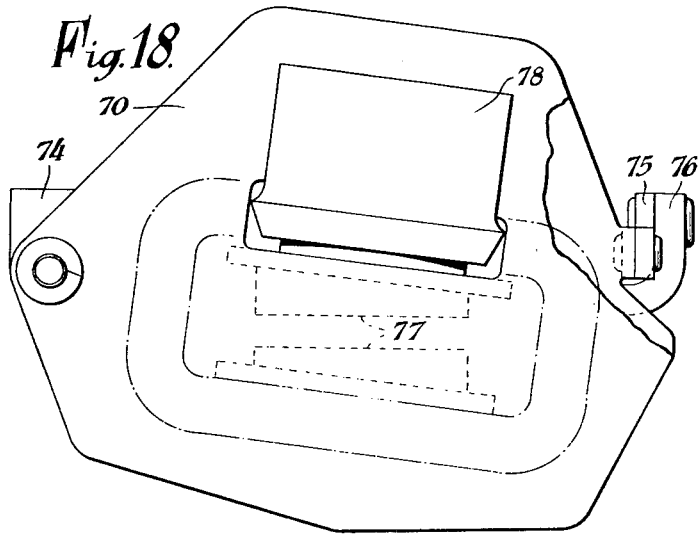
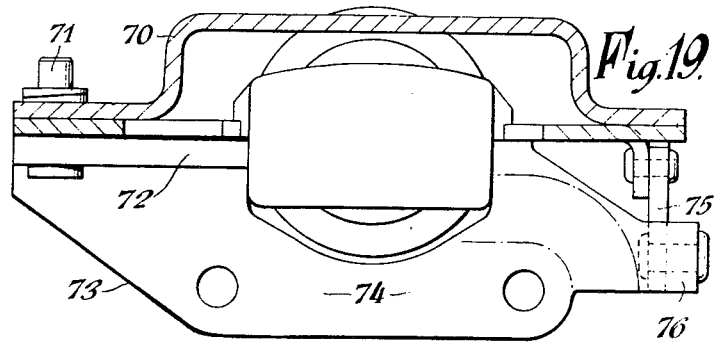
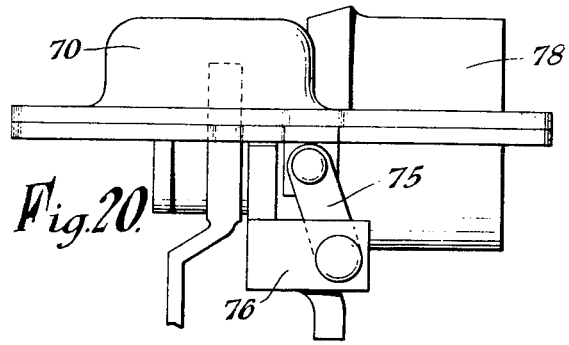
INVENTOR
LESLIE CYRIL CHOUINGS
By Lawrence J. Winter
ATTORNEY

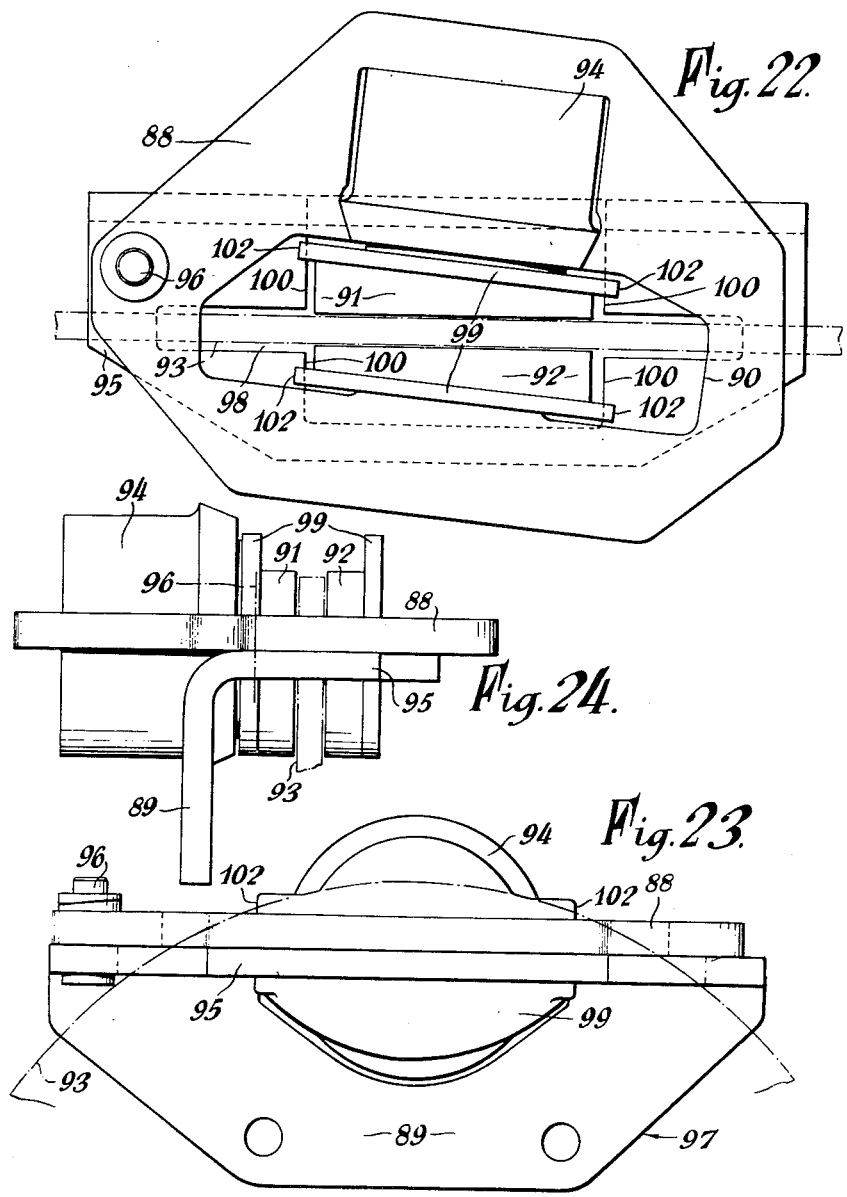

United States Patent Office 3,199,632
Patented Aug. 10, 1965

3,199,632
CLOSED LOOP, SPOT TYPE, DISC BRAKE
Leslie Cyril Chouings, Leamington Spa, England, assignor to Automotive Products Company Limited, Leamington Spa, England
Filed Oct. 17, 1961, Ser. No. 145,634
Claims priority, application Great Britain, Oct. 18, 1960, 35,727/60
16 Claims. (Cl. 188—73)

This invention relates to disc brakes of the kind comprising a movable member and a fixed support therefor and in which the reaction force resulting from contact with the brake disc of a brake pad or pads on one side of the brake disc results in movement of a movable member relative to the fixed support to bring the pad or pads on the opposite side of the brake disc into contact therewith.

In brake discs of the above kind according to one prior proposal the movable member is mounted so as to be capable of rectilinear movement relative to the fixed support in a direction parallel to the axis of rotation of the brake disc. In a further prior proposal the movable member is pivotally mounted so as to be capable of a swinging movement relative to the fixed support, and it is with disc brakes of this latter kind with which the present invention is concerned. Accordingly in the present specification the expression "disc brakes of the kind hereinbefore set forth" is to be understood to refer to disc brakes in which the movable member is pivotally mounted so as to be capable of a swinging movement relative to the fixed support.

It is well known that with a disc brake, during a braking operation forces are set up which act respectively in a direction substantially normal to the plane of rotation of the brake disc and referred to in the present specification as the clamping force, and in a direction substantially parallel to the plane of rotation of the brake disc and referred to in the present specification as the "drag forces."

In disc brakes generally, particularly in constructions in which the whole or part of the drag force is taken by the movable member, the effect of the drag forces on the brake mechanism seriously affect the design and construction of the same as provision must be made to counteract any action which may affect efficient operation of the brake. Thus in disc brakes of the kind hereinbefore set forth the disposition of the pivotal axis of the movable member in relation to the drag force resultant is important and this factor is taken into consideration in a disc brake according to the present invention.

According to the present invention, therefore, in a disc brake of the kind hereinbefore set forth the movable member is pivotally mounted so as to be swingable about an axis perpendicular to or substantially perpendicular to the drag force resultant and disposed parallel to the plane of rotation of the brake disc. In a disc brake of the kind hereinbefore set forth according to the present invention it may be desirable to dispose the pivotal axis of the movable member at an angle to the resultant of the drag force. For example this arrangement may be advantageous for constructional or for brake location purposes. Thus it will be appreciated that the disposition of the pivotal axis of the movable member can be arranged perpendicular to the drag force resultant or at any desired angle in relation thereto to suit particular requirements.

A disc brake according to the invention comprises for example a fixed support, a movable member pivotally mounted on the fixed support so as to be swingable about an axis perpendicular to or substantially perpendicular to the drag force resultant and disposed parallel to the plane of rotation of the brake disc and actuating means carried by the movable member so as to be located on one side of the brake disc and operable to move the pad or pads on that side of the brake disc into contact with the brake disc, such contact resulting in swinging movement of the movable member to bring the brake pad or pads on the other side of the brake disc into contact therewith.

The movable member can be of any desired construction. For example the same can be of the well known saddle construction, in which a saddle of substantially U section is supported in position so as to straddle the brake disc and extend over a peripheral portion of the brake disc with the latter located between the limbs. Advantageously however and in a preferred construction, the movable member is formed as a closed loop which has the advantage that the same can be of lighter construction than possible with the more usual construction whilst at the same time the necessary rigidity is provided to resist the forces set up in the disc brake and acting in a direction normal to the plane of rotation of the brake disc and referred to as the clamping force. The movable member can therefore be in the form of a closed loop perpendicular to the plane of rotation of the brake disc so as to encircle the brake pads and a peripheral portion of the brake disc and which is so arranged that the clamping force tends to separate those portions of the movable member which lie parallel to the disc and are resisted by the portions thereof which interconnect the first-mentioned portions. Thus a disc brake according to this aspect of the invention comprises for example, a fixed support, a movable member pivotally mounted on the fixed support so as to be swingable about an axis perpendicular to or substantially perpendicular to the drag force resultant and disposed parallel to the plane of rotation of the brake disc, said movable member forming a closed loop perpendicular to the plane of rotation of the brake disc so as to encircle the pads and a peripheral portion of the brake disc, actuating means carried by the movable member so as to be located on one side of the brake disc and operable to move the brake pad or pads on that side of the brake disc into contact with the brake disc, such contact resulting in swinging movement of the movable member to bring the brake pad or pads on the other side of the brake disc into contact therewith, the movable member being arranged so that the clamping force tends to separate those portions of the movable member which lie parallel to the brake disc and is resisted by the portions thereof which interconnect the first-mentioned portions.

With the closed loop construction the closed loop movable member can be flat and arranged on the fixed support so that it lies in a plane normal to the plane of rotation of the brake disc. In addition the movable member can be of one piece construction or can be built up from separate portions rivetted or otherwise secured together. For example the required closed loop construction can be obtained by forming the movable member as a flat plate made as a one piece structure or built up from laminar portions, which is arranged on the fixed support so that the plane of the flat plate lies perpendicular to the plane of rotation of the brake disc, the flat plate having an opening to receive a peripheral portion of the brake disc and the brake pads on either side of the brake disc.

To compensate for the angular displacement of the movable member in relation to the brake disc due to the swinging movement of the former, the brake pads can be tapered to ensure maximum area of contact between the engaging surfaces of the brake disc and brake pads during braking. Alternatively each brake pad can have parallel faces provision being made to permit the brake pads to have pivotal movement whereby the braking surfaces of the brake pads will automatically align with the brake disc upon contact therewith.

Embodiments of fluid pressure operated disc brakes according to the invention will now be described by way of example by aid of the accompanying diagrammatic drawings in which:

FIGURE 4 is a section on the line IV—IV of FIGURE 1;

FIGURE 5 is a fragmentary view in section on the line V—V of FIGURE 1;

FIGURE 6 is a fragmentary view in section on the line VI—VI of FIGURE 1;

FIGURE 9 is a section on the line IX—IX of FIGURE 7;

FIGURE 10 is a fragmentary view in section on the line X—X of FIGURE 8;

FIGURE 11 is a fragmentary view in section on the line XI—XI of FIGURE 7;

FIGURE 14 is a view in direction of the upper arrow of FIGURE 12;

FIGURE 15 is a view as seen from the left side of FIGURE 12;

FIGURE 16 is a view as seen from the right side of FIGURE 12;

FIGURE 17 is a section on the line XVII—XVII of FIGURE 12;

FIGURES 18 to 20 show a disc brake according to another embodiment of the invention;

FIGURES 22, 23 and 24 show a disc brake according to a further embodiment of the invention, FIGURE 22 being a plan view, FIGURE 23 an elevation and FIGURE 24 an end view from the left of FIGURE 23.

Figure 1:
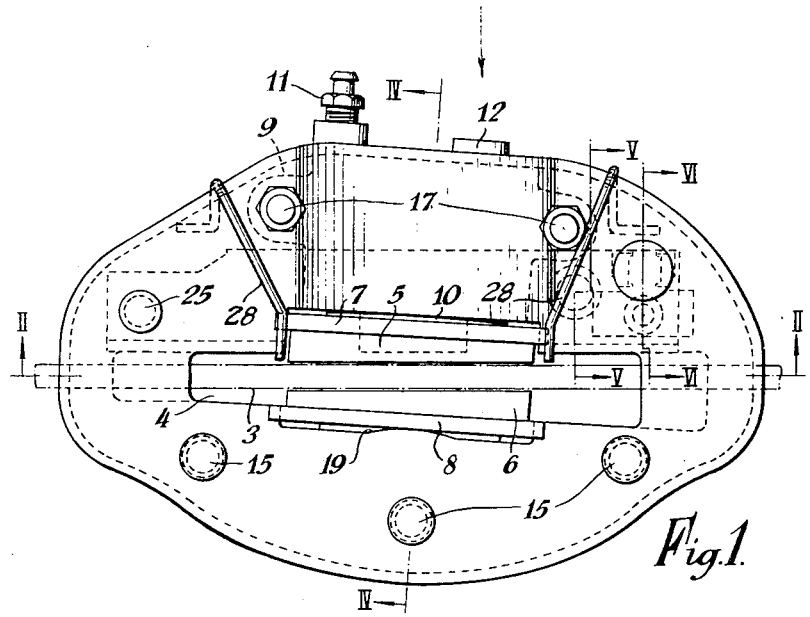
FIGURE 1 is a plan view of a disc brake according to one embodiment of the invention.
Figure 2:
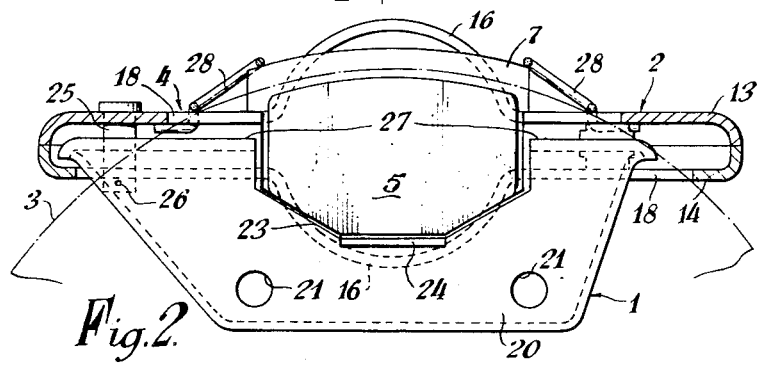
FIGURE 2 is a section on line II—II of FIGURE 1.
Figure 3:
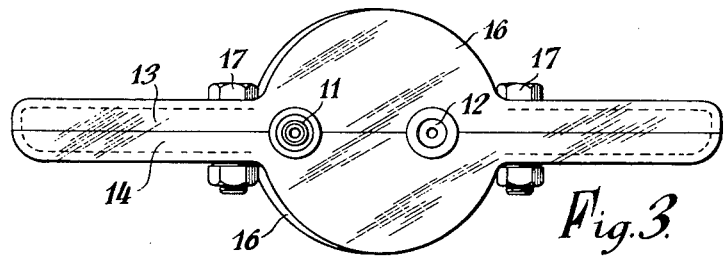
FIGURE 3 is a view of the movable member as seen in the direction of the arrow FIGURE 1.
Figure 7:
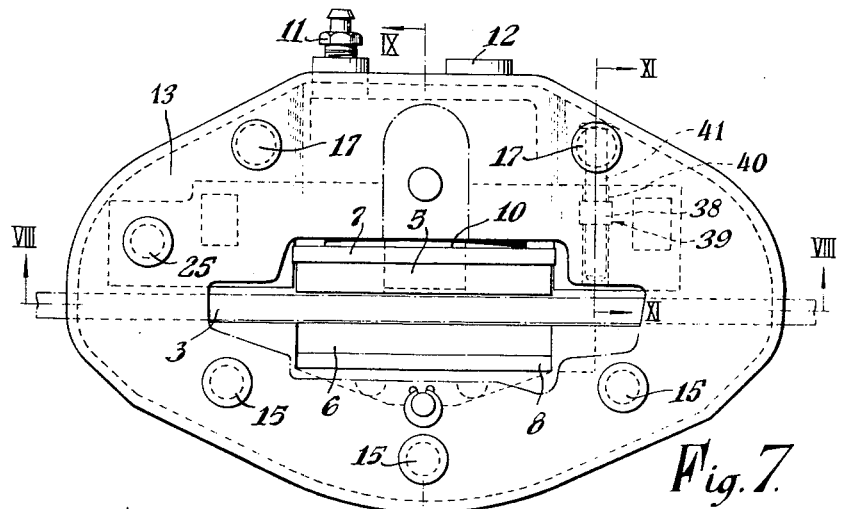
FIGURE 7 is a plan view of a disc brake according to a second embodiment of the invention.
Figure 8:
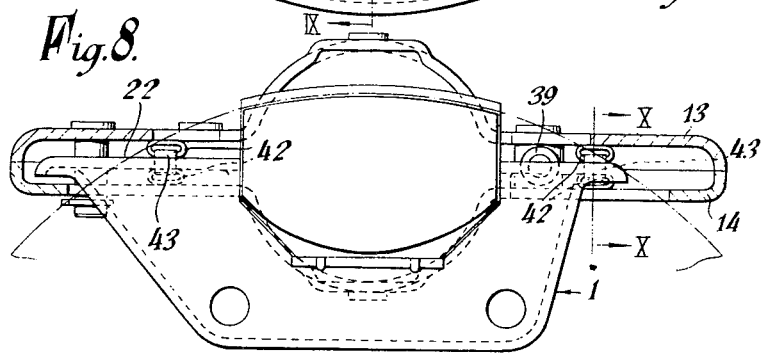
FIGURE 8 is a section on the line VIII—VIII of FIGURE 7.

Referring to FIGURES 1 to 6 of the accompanying drawings the disc brake comprises a fixed support denoted generally by the reference numeral 1 and a movable member denoted generally by the reference numeral 2 carried by the fixed support so as to be swingable about a pivot pin 25, the longitudinal axis which is disposed perpendicular to the drag force resultant and offset to one side thereof. The fixed support 1 is adapted to be mounted on the stationary part of for example a wheel assembly with the movable member 2 arranged in a plane normal to the plane of rotation of the brake disc the outline of which is shown at 3, the movable member having an opening 4 to receive a peripheral portion of the brake disc and the brake pads 5, 6 disposed one on either side of the brake disc. Each brake pad is secured to a metal backing plate shown at 7 and 8 respectively. The movable member 2 carries a hydraulic cylinder 9 arranged on one side of the brake disc, the cylinder having a piston 10 and bleed and outlet openings 11 and 12 the latter for connection to a fluid pressure system. In operation outward movement of the piston 10 resulting from the admission of pressure fluid to the hydraulic cylinder results in movement of the brake pad 5 into contact with the brake disc 3 the reaction force thus set up causing swinging movement of the movable member 2 in a direction opposite to the movement of the brake pad 5, the resulting engagement of the abutment surface formed by the inner edge of the opening 4 with the metal backing plate 8 of the brake pad 6 bringing the latter also into contact with the brake disc. During a braking operation the force, referred to as the drag force, which is additional to the clamping force, is set up as a result of the tendency for the brake pads to move with the brake disc when in contact with the rotating brake disc. In the construction shown the fixed support 1 is provided with means hereinafter described which co-operate with the metal backing plate 7 of the brake pad 5 to restrain the pad against displacement about the axis of the brake disc when in contact with the rotating brake disc so that the drag force of this brake pad is taken directly by the fixed support and not by the movable member 2, the metal backing plate 8 of the brake pad 6 co-operating with the movable member 2 in such manner that the drag force of this pad is taken by the movable member.

In the particular construction shown in FIGURES 1 to 6 the movable member is formed to provide a closed loop construction and consists of two dished metal pressings 13, 14 placed hollow sides facing and secured together by rivets 15 to provide a rigid hollow structure. Each metal pressing is formed with a curved portion 16, the said portions forming together a substantially cylindrical recess to receive the hydraulic cylinder 9 which is secured by bolts 17. Each metal pressing in itself forms a closed loop around an aperture 18 therein the openings jointly providing the opening 4 when the metal pressings are assembled together. The hydraulic cylinder 9 is arranged with the outer end of the piston facing towards the brake disc, the brake pad 5 being disposed between the piston end and one side of the brake disc the other brake pad 6 being disposed between the opposite face of the brake disc and an edge 19 of the opening 4 such edge providing an abutment for contacting the metal backing plate of the pad 6. Each brake pad is tapered and the hydraulic cylinder is mounted in the movable member so that the axis along which the piston 10 moves is at a suitable angle to the tapered surface of the brake pads, whereby the outer end of the piston 10 is square with the metal backing plate 7.

The fixed support 1 is advantageously made as a sheet metal pressing, formed in cross-section as shown in FIGURE 4, the web portion 20 having two holes 21 adjacent one edge thereof herein referred to as the radially inner edge, the opposite edge or radially outer edge having a flange 22 extending laterally outwards on one side of the web portion. The web portion 20 is partially cut away in the central region to provide a gap 23 shaped to receive the hydraulic cylinder 9, the metal at the inner edge of the gap being bent over to provide a ledge 24 extending laterally on the side of the web portion opposite to the flange 22.

In the assembled disc brake the flange 22 of the fixed support is positioned in the space between the metal pressings 13, 14 of the movable member the hydraulic cylinder 9 locating in the gap 23. The movable member is pivotally mounted the pivot pin 25 which is located adjacent one end of the flange 22 so that the same is offset to one side of the brake disc and from the axis of rotation thereof. The pivot pin 25 passes through aligned holes in the metal pressings 13, 14 and in the flange 22 of the fixed support, the pivot pin having an enlarged head at one end which together with a split pin 26 at the other end retains the pivot pin in the holes. The metal backing plate of each brake pad is formed at each end to provide a shoulder 27 the shoulders 27 of the metal plate 7 of brake pad 5 engaging the adjacent edges of the gap in the flange 22 of the fixed support when the pad 5 is in position in the opening 4 whilst the shoulders 27 of the metal plate 8 of brake pad 6 engage adjacent edges of the aperture 18 in the dished metal pressing 13 when this brake pad 6 is in position in the opening 4, the shoulders 27 being arranged so that the brake pads are positioned correctly in relation to the piston 10 of the hydraulic cylinder 9. Spring retaining plates 28 carried by the movable member bear on the radially outer edges of the brake pads to retain the pads in position radially. Removal of the plates 28 permits readily the withdrawal or insertion of the brake pads.

In use the disc brake is located in position with the web 20 of the fixed support 1 extending parallel to the plane of rotation of the brake disc the fixed support being secured to a fixed part of the wheel assembly by bolts passing through the bolt holes 21 so that the movable member 2 extends in a plane normal to the plane of rotation of the brake disc. During brake operation upon the admission of pressure fluid to the hydraulic cylinder 9 the brake pad 5 is moved into contact with the brake disc the reactionary force set up resulting in swinging movement of the movable member 2 thus causing the abutment edge 19 to pull the brake pad 6 also into engagement with the brake disc. The drag force resulting from engagement of the brake pads with the rotating brake disc is transmitted directly to the fixed support through the metal backing plate 7 of brake pad 5 and to the movable member through the metal backing plate 8 of brake pad 6.

When the brake is released after a braking operation the return swinging movement of the movable member is controlled by a friction device operating between the movable member and the fixed support thus compensating for wear on the brake pads. The means for this purpose is shown in FIGURE 5 and comprises a friction device consisting of a stationary rod 29 carried by the flange of the fixed support 1 so as to extend parallel to the plane of the flange. The rod has a sleeve 30 of friction material mounted thereon which is disposed within a recess 31 of a bush 32 carried by the movable member the sleeve being of shorter length than the width of the recess. The sleeve 30 thus provides a stop the position of which on the rod 29 is automatically adjusted by the relative displacement between the sleeve and rod during swinging movement of the movable member.

To assist in maintaining the movable member in its plane of movement, and reduce or eliminate chatter a plug or plugs of rubber or other resilient material 33 see FIGURE 6, is provided on the flange 22 of the fixed support 1 so as to project outwardly on either side of the flange and extend across the space between the opposite inside faces of the dished metal pressings 13, 14 the opposite ends of each plug being in contact with the said inside faces.

In the disc brake according to the second embodiment of the invention shown in FIGURES 7 to 11 of the accompanying drawings the construction of the fixed support and the movable member and the pivotal mounting of the latter on the fixed support is substantially identical to that disclosed in FIGURES 1 to 6 and accordingly where possible the same reference numerals are used to identify corresponding parts. The disc brake according to this second embodiment however differs primarily from the first described embodiment in that to compensate for the angular displacement of the movable member due to its swinging movement pivotal movement of the brake pad 6 and the hydraulic cylinder 9 each about axes parallel to the pivotal axis of the movable member is provided for the brake pad 5 being maintained parallel to the brake disc.

For the above purpose the portions 16 of the dished metal pressings 13, 14, are formed to provide a clearance around the hydraulic cylinder 9 to permit the hydraulic cylinder to pivot about diametrically opposite pivotal mountings constituted by pivot pins 34 carried by the said portion 16. Each pivot pin 34 has a plain shank portion which locates in a hole in the appropriate portion 16 the inner end of each shank being threaded for screwing into a correspondingly tapped hole in the hydraulic cylinder, the periphery of the hydraulic cylinder in the region surrounding each tapped hole being formed to provide a flat bearing surface 35 which co-operates with the opposite faces of the portions 16. Pivotal movement of the brake pad 6 is obtained by providing the metal backing plate 8 with an outwardly extending yoke 36, engageable with a pivot pin 37 carried by the movable member 2, the yoke enabling the backing plate to swing about the pivot pin so that the brake pad 6 can also align itself with the brake disc when moved into contact therewith. With this construction the pivot pin 37 provides the abutment through which the swinging movement of the movable member 2 is transmitted to the brake pad 6.

In this embodiment of the invention a modified means is provided for controlling the return movement of the movable member upon release of the brake after braking operation to compensate for wear on the brake pads. Such means comprises a friction device which as shown in FIGURE 11, consists of a sleeve 38 of friction material which is disposed in an enlarged portion 39 of a slot 40 in the flange 22 of the fixed support 1. The slot 40 extends inwardly from the outer edge of the flange and receives a rod 41 carried by the movable member 2 the rod passing through the sleeve 38. Thus the sleeve provides a stop the position of which on the rod 41 determines the angular position of the movable member. FIGURE 10 shows a modified construction of means for preventing chatter in the brake which is incorporated in the brake of the present embodiment. Such means consists of pairs of tubular sleeves 42 of for example synthetic rubber located one on either side of the flange 22 of the fixed support 1 each pair of sleeves being retained in position by a retaining clip 43 which extends through the sleeves and through holes in the flange.

In the disc brake disclosed in FIGURES 12 to 17 of the accompanying drawings the movable member is also of the closed loop construction and is substantially flat and of laminar construction. In the particular construction shown the movable member denoted generally by reference numeral 44, is built up from three separate sheet metal plates 45 arranged one on top of the other and secured together by for example, rivets (not shown).

Each plate in itself forms a closed loop around an opening therein the openings jointly providing the opening 4 which thus extends through the thickness of the three plates when assembled one on top of the other. The opening 4 is shaped in plan form to provide two portions, a portion 46 for receiving a peripheral portion of the brake disc 47 and pads 48, 49 and a portion 50 receiving the hydraulic cylinder 51 which has the inlet and outlet openings 52, 53 for connection to the fluid pressure system. The hydraulic cylinder 51 projects outwardly beyond the opposite faces of the movable member to which it is secured by the location of diametrically opposite lugs 54 on the cylinder between the outer plates 45, the intermediate plate being suitably cut away to provide spaces for the accommodation of the lugs 54. Further lugs 55 also provided on the hydraulic cylinder engage in correspondingly shaped slots 56 extending through the thickness of the upper end intermediate plates 45 thus locating the cylinder axially in position. The hydraulic cylinder is arranged with the outer end of the piston 57 thereof facing towards the brake disc the pad 48 being located between the piston end and one side of the brake disc, the other pad 49 being located between the opposite face of the brake disc and an edge 58 of the portion 46 of the opening 4 such edge providing an abutment for contacting the pad 49. The brake pads 48, 49 are of tapered construction, each having a metal backing plate shown at 62 and 63 respectively, and the hydraulic cylinder is correspondingly angularly disposed as disclosed in the first described embodiment, the edge 58 being also arranged at an angle so as to be parallel to the face of the piston.

The fixed support 59 is advantageously made as a sheet metal pressing and consists of a web portion 60 having holes 61 adjacent one edge referred to as the radially inner edge. The web portion 60 is formed in the central region to provide a gap 64 the edge surrounding the cut away portion having a flange 65 which extends laterally towards the brake disc the flange continuing along the upper edge of the end portions of the web on either side of the gap to provide flat surfaces 66 parallel to the plane of the movable member.

In the assembled disc brake the movable member 44 is positioned on the flat surfaces 66 of the web portion of the fixed support on one of which it is pivotally mounted by a pivot pin 67 which extends through the combined thickness of the three plates 45 and through a hole in the flange portion of the web, the pivot pin having an enlarged head at each end so that the same is retained in the holes. The brake pads 48 and 49 are positioned one on either side of the brake disc, the metal backing plate 62 of the brake pad 48 facing the piston of the hydraulic cylinder and the metal backing plate 63 of the brake pad 49 facing the abutment edge 58. The brake pad 48 is accommodated in the gap 64 so as to be surrounded by the flanged edge thereof, the brake pad 49 being located in position by engaging ledges 68 provided one at each side of the opening 4 in the movable member 44, in slots formed in outwardly extending lugs 69 formed one on each side of the metal backing plate 63. A removable cover or other means not shown are provided for enclosing the radially outer edges of the pads when in position, and means also not shown are provided for reducing or eliminating chatter in the brake. Means can also be provided for controlling the swinging movement of the movable member upon release of the brake after a braking operation such means operating to compensate for brake pad wear as described, in the previous embodiments.

In use the disc brake is located in position with the web of the fixed support 59 extending parallel to the plane of rotation of the brake disc the fixed support being secured to a fixed part of the wheel assembly by bolts passing through the bolt holes 61 so that the movable member 44 extends in a plane normal to the plane of rotation of the brake disc. During brake operation, upon the admission of pressure fluid to the hydraulic cylinder 51, the brake pad 48 is moved into contact with the brake disc the reactionary force set up resulting in swinging movement of the movable member 44 thus causing the abutment edge 58 to pull the brake pad 49 also into engagement with the brake disc. The drag force resulting from engagement of the brake pads with the rotating disc is therefore transmitted directly to the fixed support through the brake pad 48 and to the movable member through the metal backing plate of the brake pad 49.

In each of the above described embodiments, the fixed support is provided with flat surfaces on which the movable member is either directly or indirectly supported so as to be capable of the desired swinging movement. However according to a further arrangement of disc brake according to the invention the movable member can be supported at a position remote from the pivotal position by a link or links each of which is pivotally connected to the fixed support and to the movable member the pivotal connections being arranged so that each link can swing about an axis disposed at right angles to the pivotal axis about which the movable member swings in its movement towards the brake disc.

FIGURES 18, 19, 20 of the accompanying drawings show diagrammatically a disc brake constructed in this manner. In the construction shown, the movable member shown generally at 70 and consisting of two plates secured one on top of the other, is pivotally mounted on a pivot pin 71 extending through the thickness of the two plates and through a flange 72 which extends for a portion of the length of the web 73 of the fixed support shown generally at 74. The movable member at its pivotally mounted end rests on the outer surface of the flange 72 the movable member at its opposite end being pivotally attached to one end of a link 75 the opposite end of which is pivotally attached to a lug 76 forming part of the fixed support, the pivotal connections of the link being arranged at right angles to the pivotal axis of the movable member so that the latter can swing freely. The movable member is of closed loop construction and is provided with an opening to accommodate the brake pads 77 and a peripheral portion of the brake disc. The disc brake is adapted for operation by fluid pressure for which purpose brake actuating means in the form of a hydraulic cylinder 78 is carried by the movable member.

Figure 21:
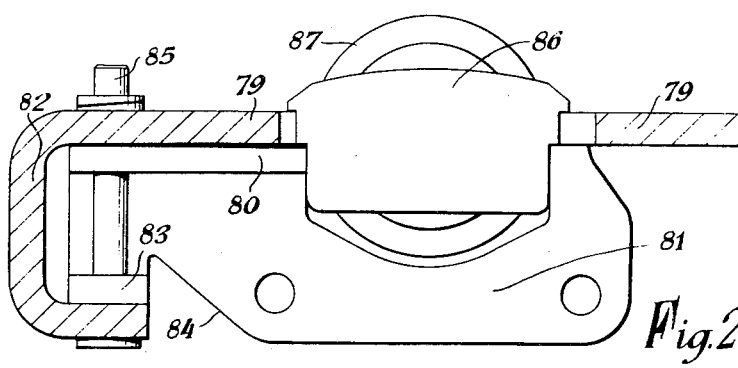
FIGURE 21 shows a disc brake according to a still further embodiment of the invention.
Figure 12:
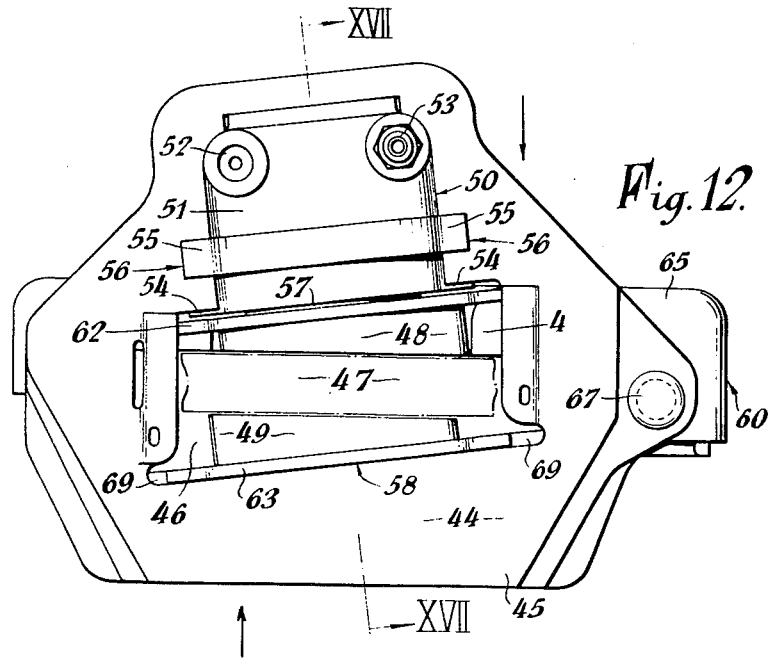
FIGURE 12 is a plan view of a disc brake according to a further embodiment of the invention.
Figure 13:
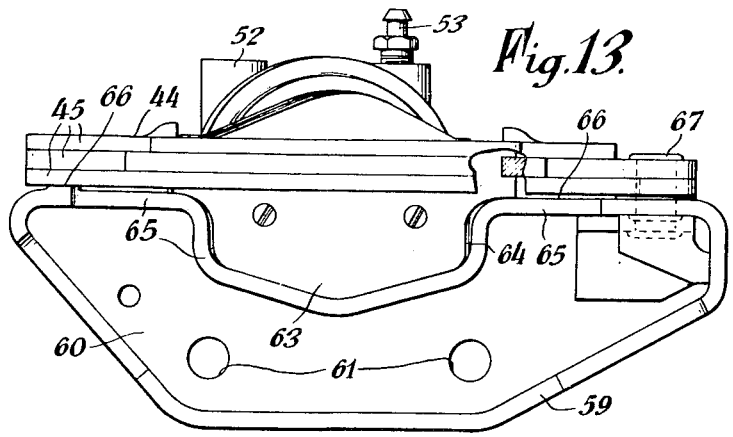
FIGURE 13 is a view in the direction of the lower arrow of FIGURE 12.

In the further embodiment of the invention shown diagrammatically in FIGURE 21 of the drawings, the movable member 79, which is flat and of closed loop construction rests at one end on the surface of a flange portion 80 of the fixed support 81. The end of the movable member resting on the flange is formed to provide a yoke 82 which embraces a lug 83 extending outwardly from the web portion 84 of the fixed support so as to lie parallel to the flange portion 80, the movable member being pivotally mounted on the fixed support by a pivot pin 85 which passes through the yoke, lug and flange. As in the previous embodiments the movable member has an opening for the accommodation of the brake pads one of which is shown at 86 and a peripheral portion of the brake disc, not shown, a hydraulic cylinder 87 being carried by the movable member to provide fluid operated brake actuating means.

In all of the above described embodiments the brake pads are supported in such manner that the drag force arising during a braking operation is taken both by the fixed support and the movable member. It is possible however to construct a disc brake according to the invention so that the drag force is taken wholly by the fixed support and FIGURES 22 to 24 of the accompanying drawings show one form of disc brake for this purpose.

The disc brake according to this embodiment of the invention comprises a movable member denoted generally by the reference numeral 88 which is pivotally mounted on a fixed support denoted generally by the reference numeral 89. As in the previously described embodiments the movable member is formed as a closed loop and comprises a flat member which can be a single plate or laminar construction, the movable member having an opening 90 for receiving the brake pads 91, 92 arranged one on either side of the brake disc the outline of which is shown at 93, and a peripheral portion of the brake disc. The opening is also formed to receive the hydraulic cylinder 94, disposed on one side of the brake disc, which provides brake actuating means.

In the assembled disc brake according to this embodiment the movable member is arranged on the fixed support with one face of the movable member in contact with the opposite face of a flange 95 forming part of the fixed support and on which it is pivotally mounted by a pivot pin 96. The web portion 97 of the fixed support is formed in its central region to provide a gap to receive the hydraulic cylinder and the flange portion 95 has a slot 98 to receive the peripheral portion of the brake disc and the brake pads each of which has a metal backing plate 99. The brake pads 91 and 92 each extend between edges 100 and 101 respectively of the slot 98 in the fixed support so that during braking the drag force is transmitted from the metal backing plates directly to the fixed support as a result of contact between the sides of the metal backing plates and the slot edges 100, 101, the edges of the metal backing plates are stepped to provide at each side a shoulder 102 engageable over the edges 100 and 101 to locate the brake pads radially in relation to the hydraulic cylinder. A removable cover or other retaining means not shown, is provided to retain the pads from displacement in the radial outward direction in relation to the brake disc.

In the embodiments of the invention disclosed in connection with FIGURES 18 to 20, 21 and 22 to 24 the hydraulic cylinder is secured to the movable member and the hydraulic cylinder is provided with a bevelled edge around the open end thereof the adjacent edges of the opening in the movable member having correspondingly tapered surfaces arranged so that as the hydraulic cylinder is inserted into the opening, the bevelled edge and tapered surfaces co-operate to wedge the hydraulic cylinder in position the closed end of the cylinder being forced against the adjacent edge of the opening in the movable member.

I claim:

1. A disc brake comprising a fixed support having a substantially horizontal portion, a closed loop member, defining a central opening, slidably disposed on said horizontal portion, one end of said horizontal portion and said loop member being pivotally connected together, the opposite adjacent ends of said horizontal portion and closed loop member being unconnected to each other and freely movable with respect to each other to permit swinging of said loop member in a substantially horizontal plane with respect to said fixed support.

2. The disc brake of claim 1 wherein said ends are pivotally connected together at a point that is offset to one side of said central opening and a brake disc disposed in said opening.

3. The disc brake of claim 1 wherein said horizontal portion and movable member are pivotally connected together by substantially vertical pin means.

4. A disc brake comprising a fixed support with a substantially horizontal portion, a closed loop member defining a central opening slidably disposed on said horizontal portion, vertical pin means pivotally connecting one end of said portion and movable member to each other, the opposite adjacent ends of said portion and movable member being unconnected and freely movable with respect to each other, a brake disc adapted to extend into said opening, pad means on said movable member disposed on opposite sides of said brake disc, actuating means on said movable member operatively connected to said pad means to move a pad means on one side of said brake disc into contact with said brake disc to swing said movable member in a horizontal plane and move said pad means on the opposite side of said brake disc into contact with said brake disc.

5. The disc brake of claim 4 wherein said movable member is disposed at right angles to the plane of rotation of said disc brake.

6. A disc brake according to claim 5, wherein the movable member is of flat plate construction.

7. A disc brake according to claim 6, where in the movable member is a single flat plate.

8. A disc brake according to claim 6, wherein the movable member is constructed from at least two flat plates arranged one on the other and secured together to provide a unitary structure.

9. A disc brake according to claim 4 wherein abutment means are provided by said edge of an opening of said movable member.

10. A disc brake according to claim 9 wherein said brake pad means are supported so that the drag force resulting from contact of said brake pad means with said rotating brake disc is taken partly by said fixed support and partly by said movable member.

11. A disc brake according to claim 9 wherein said brake pad means are supported so that the drag force resulting from contact of said brake pad means with said rotating disc brake is taken wholly by said fixed support.

12. A disc brake according to claim 10 wherein the movable member and the fixed support are formed from sheet metal.

13. A disc brake according to claim 4 wherein said brake pad means are tapered to compensate for the angular movement of said movable member during swinging.

14. A disc brake according to claim 4 wherein said brake pad means are provided with pivotal means to compensate for the angular movement of said movable member during swinging.

15. A disc brake according to claim 4 wherein means are provided for effecting automatically adjustment of said brake pad means to compensate for wear.

16. A disc brake comprising a fixed support with a substantially horizontal portion, a closed loop member slidably disposed on said horizontal portion, vertical pin means pivotally connecting one end of said horizontal portion and closed loop member to each other, the opposite adjacent ends of said horizontal portion and closed loop member being movable with respect to each other, a brake disc adapted to extend into the opening defined by the closed loop of said member, pad means on said closed loop member disposed on opposite sides of said brake disc, actuating means on said closed loop member operatively connected to said pad means to move a pad means on one side of said brake disc into contact with said brake disc to swing said closed loop member in a horizontal plane and move said pad means on the opposite side of said brake disc into contact with said brake disc.

References Cited by the Examiner

UNITED STATES PATENTS 2,663,384 12/53 Chamberlain _____ 188—152.873
2,966,964 1/61 Brueder _____ 188—73

ARTHUR L. LA POINT, *Primary Examiner.*

EUGENE B. BOTZ, *Examiner.*